United States Patent
Kashyap et al.

(10) Patent No.: US 10,956,413 B2
(45) Date of Patent: Mar. 23, 2021

(54) ACTION SET TRANSLATION

(71) Applicant: salesforce.com, inc., San Francisco, CA (US)

(72) Inventors: Ashwin Kashyap, Foster City, CA (US); Arthur Kong, Daly City, CA (US); Philip Alexander Waligora, Mill Creek, WA (US); Margaret Cyrzan, Toronto (CA); Anjali Ashok, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 91 days.

(21) Appl. No.: 16/176,830

(22) Filed: Oct. 31, 2018

(65) Prior Publication Data

US 2020/0134068 A1   Apr. 30, 2020

(51) Int. Cl.
| | |
|---|---|
| *G06F 9/46* | (2006.01) |
| *G06F 16/2452* | (2019.01) |
| *G06F 9/48* | (2006.01) |
| *G06F 9/448* | (2018.01) |
| *G06F 16/901* | (2019.01) |

(52) U.S. Cl.
CPC ...... *G06F 16/24524* (2019.01); *G06F 9/4494* (2018.02); *G06F 9/465* (2013.01); *G06F 9/4881* (2013.01); *G06F 16/9024* (2019.01)

(58) Field of Classification Search
CPC ................................................. G06F 16/24524
USPC ........................................................ 718/102
See application file for complete search history.

(56) References Cited

U.S. PATENT DOCUMENTS

| | | | |
|---|---|---|---|
| 7,885,840 B2 * | 2/2011 | Sadiq | G06Q 10/06311 |
| 8,117,233 B2 * | 2/2012 | Liu | G06Q 10/10 |
| | | | 707/802 |
| 8,214,475 B1 * | 7/2012 | Scofield | H04L 67/1053 |
| | | | 709/217 |
| 2004/0111430 A1 * | 6/2004 | Hertling | G06Q 10/06 |
| 2005/0071209 A1 * | 3/2005 | Tatavu | G06Q 10/0631 |
| | | | 705/7.12 |
| 2007/0011321 A1 * | 1/2007 | Huntington | H04L 43/028 |
| | | | 709/224 |
| 2009/0007127 A1 * | 1/2009 | Roberts | G06F 9/5066 |
| | | | 718/104 |
| 2018/0053328 A1 * | 2/2018 | Simonovic | G06T 11/206 |
| 2018/0095610 A1 * | 4/2018 | Wieder | G06F 16/188 |
| 2018/0217868 A1 * | 8/2018 | Golas | G06F 9/5022 |

\* cited by examiner

*Primary Examiner* — Evral E Bodden
(74) *Attorney, Agent, or Firm* — Holland & Hart LLP

(57) ABSTRACT

A database system translates a received set of workflow actions into a graph of nodes. The graph of nodes includes a node set corresponding to each node type of the set of workflow actions. Each node set may be re-executable for each instance of an action type of the set of workflow actions. Upon completion of an action, the graph of nodes is executed. Execution of the graph of nodes includes executing processor executable instructions corresponding to a subset of the set of workflow actions. The subset may be determined based on the completed action. The completed action may be determined based on a sequence tracking parameter.

20 Claims, 11 Drawing Sheets

ACTION SET TRANSLATION

FIELD OF TECHNOLOGY

The present disclosure relates generally to database systems and data processing, and more specifically to action set translation.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, managing contacts of a user may include scheduling workflow actions using the cloud platform. A set of workflow actions corresponding to contact management may include a large number of repeated actions in various timeframes, which may result in a large process flow that utilizes significant computing resources such as processing and memory to create and update records corresponding to contacts and contact management.

DETAILED DESCRIPTION

Figure 1:
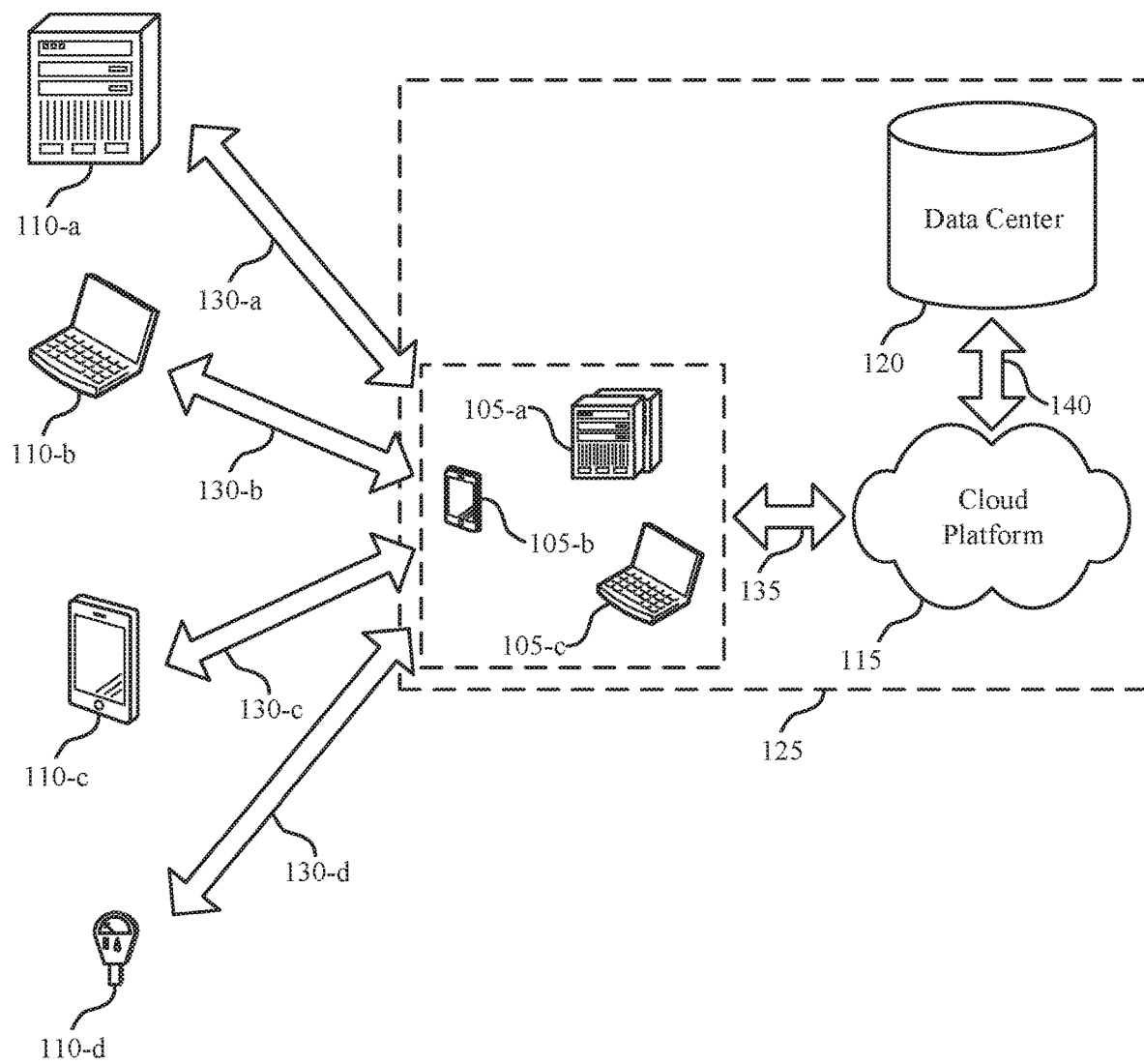
FIG. 1 illustrates an example of a system that supports action set translation in accordance with aspects of the present disclosure.

A sales manager or other business administrator may schedule a set of workflow actions and assign such actions to one or more clients. The set of workflow actions may include actions such as email client, call client, message client, wait for a time period before contacting client, etc. A set of such actions may be associated with computational operations such as creating and updating records responsive to completion of an action. These computational operations may benefit the sales manager in that the records associated with clients remain current, which, in turn, benefits an organization in tracking data, client contact data, the efficiency of the sales manager, team efficiency, sales data, etc.

A set of workflow actions may be translated into a graph of nodes where each node corresponds to a set of processor executable instructions. For example, a set of workflow actions may be scheduled by a sales manager and may include a plurality of actions, such as email a client, call the client, wait three days, email the client, call the client, etc. The action set is translated into a graph of nodes that may be executed upon completion of one of the actions by the sales manager or an associated party. The graph of nodes may correspond to processor executable instructions such as create or update records, determine status, etc. For example, when the sales manager completes a "email client" action, a client facing application may send a notification that triggers execution of the corresponding graph of nodes and the associated records may be updated. The graph of nodes may further notify the sales manager about the next action in the set of actions. In some cases, a set of actions may include a larger number of repeated actions (e.g., emails) in linear format, and a sales manager that manages many clients may have a large number of actions to complete each day. In such cases, a graph of nodes that correspond to a set of actions may be large or long and linear, which may occupy significant computing resources such as processing resources and memory resources. For example, a graph of nodes that includes a set of nodes for each email action in a set may occupy a significant amount of memory and may further utilize processing resources waiting for one of the actions to be completed. Furthermore, when these node sets are associated with many different clients, the node sets may utilize processing threads waiting on actions to be completed (e.g., via state machines).

Accordingly, rather than storing, keeping open, and updating a graph of nodes that includes a node set for each action in a set of actions and maintains state of the graph of nodes, the implementations described herein translates a set of actions into a constant number of nodes in a graph of nodes regardless of the number of steps in the set of actions. In other words, a linear graph of nodes may be "flattened" into a smaller branching graph. In doing so, the implementations described herein generate a set of nodes in the graph of nodes for each action type for the set of actions and may utilize a sequence tracking parameter to maintain a "state" of the graph of nodes. This results in a graph of nodes that may be executed each time an action of the action set is completed, but is not utilizing processing resources waiting on a next action to be completed. Furthermore, because the "size" of the graph of nodes is generally consistent and is not dependent on the number of actions in a set, the graph of nodes does not utilize significant computing resources, such as memory. When the implementations described are extended to a number of clients to an organization, significant resources are conserved. Further, since the graph of nodes is generally loaded, executed, and released before a next action may be completed, the set of actions and the graph of nodes may not become out of "synch."

When a set of actions is assigned to a specific client or target identifier, a sequence tracking parameter may be initialized, which may be used to maintain the sequence of the set of actions. When an action is completed by a user, an identification of a sequence tracking parameter is passed to the corresponding graph of nodes, which is opened an executed. Based on the sequence tracking parameter, the subset (e.g., branch) of the graph of nodes corresponding to the completed action is executed. The sequence tracking parameter may be updated upon execution of the graph of nodes, such that the proper subset of the graph is executed upon completion of the next action. Furthermore, the graph of nodes may be closed by releasing computing resources (e.g., processing threads) after execution of the graph. Further responsive to completion of execution of the graph of nodes, the system may trigger a notification that indicates the next action to a user (e.g., sales manager).

Aspects of the disclosure are initially described in the context of an environment supporting an on-demand database service. Aspects of the disclosure are further described with reference to a general system diagram, a detailed system diagram, an action set translation diagram, and a process flow diagram. Aspects of the disclosure are further illustrated by and described with reference to apparatus diagrams, system diagrams, and flowcharts that relate to action set translation.

FIG. 1 illustrates an example of a system 100 for cloud computing that supports action set translation in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, cloud clients 105 may utilize the cloud platform 115 to configure an action set for one or more contacts 110. For example, a sales manager for a cloud client 105 may utilize the cloud platform 115 to configure a sales workflow and assign the sales workflow to the contact 110. The workflow may include a set of actions that correspond to interactions 130 with the contact 110. Such actions may include emailing the contact 110, calling the contact 110, etc. and completion of each action may include corresponding processor executable instructions, such as creating and updating records.

In conventional systems, an administrator or developer may create a customized program or module for the workflow selected by a sales manager or other administrator. The customized program may include event handlers and/or notification systems that execute specific processor executable instructions upon completion of certain actions. In some conventional systems, a set of nodes may be automatically generated that correspond to a set of workflow actions selected by an administrator. However, in such systems, the set of nodes may be large, which may occupy and utilize significant computing resources such as processing and memory. For example, a conventional system may generate a set of nodes for each action in a set of actions, which may include a plurality of repeated actions (e.g., send email) and thus may include a large amount of nodes. Further, a conventional system may keep a set of nodes open (e.g., utilizing a thread) while a set of workflow actions is "in progress" (e.g., the sales manager has remaining actions to complete). As applied to many different clients, the large node sets and the opened processes (e.g., utilized threads) may occupy significant computing resources, such as processing resources and memory. In some cases, because there may be a larger number of "opened" workflows waiting on actions to be completed, after completion of one of one of the actions of one of the workflows, the database system may take a significant amount of time to return the next action.

In contrast, the system 100 may support an action set translation system that translates a set of workflow actions into a graph of nodes that has a consistent size (e.g., dependent on the number of action types in the set rather than the number of actions in the set) and is stateless (e.g., does not maintain the state of the set or sequence of actions and thus does not occupy processing resources such as threads). Because the size of a graph of nodes may be consistent and does not depend on a number of actions (that may be repeated), significant memory and data storage resources may be saved compared to conventional systems. Furthermore, because the graph of nodes generally do not maintain state (e.g., do not utilize processing resources waiting on the next action), significant processing resources may be conserved compared to conventional systems.

The system 100 solves these problems by translating an arbitrary set of workflow actions into a graph of nodes that includes a node set for each action type of the set of workflow actions. Each node set corresponding to an action type may be re-executable for each instance of an action type in the workflow. The nodes of the graph may correspond to processable executable instructions that are executed as the graph is executed responsive to completion of an action by a user or client 105 (e.g., a computing system of a client 105). A sequence tracking parameter may be passed when an action is completed, and the sequence tracking parameter may be utilized to determine which nodes are traversed or executed of the graph of nodes. When the graph of nodes is executed responsive to an action, the sequence tracking parameter is updated. Thus, when a next action is completed, the graph of nodes is executed, and a subset may be traversed based on the updated sequence tracking parameter and which corresponds to the completed action. Each time the graph is executed, the processing and memory resources may be released (e.g., the graph is closed) until the graph is executed responsive to completion of an additional action.

The implementations are described with respect to a set of workflow actions in a sales environment. However, it should be understood that the implementations described may be utilized in other environments. For example, a set of actions may include actions such create a document template, send template, etc., and a set of processor executable instructions may be executed upon completion of such actions. Accordingly, the implementations described herein may be utilized to automate the instructions and provide efficient action set translation and execution in many contexts.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example utilization of the system 100, a sales manager of a cloud client 105 may configure a set of workflow actions and assign such actions to a plurality of target clients (e.g., contacts 110) for completion by the sales manager or subordinates of the sales manager. The set of workflow actions may include: email the contacts 110, wait 3-days, call the contacts 110, email the contacts 110, etc. The set of workflow actions is transmitted to a backend workflow execution system (e.g., a workflow engine of the cloud platform 115), which translates the set of actions into a graph of nodes. The graph of nodes includes a set of actions corresponding to each action type of the set of workflow actions. When an action is completed (e.g., the email is sent to the contact 110) by the sales manager or the subordinate, the cloud platform 115 may detect completion of the action and send a notification to the backend workflow execution system of the cloud platform 115. The backend workflow execution system loads the corresponding graph of nodes and executes at least a subset of the graph based on a sequence tracking parameter passed with the notification. Execution of the subset includes executing the corresponding processor executable instructions (e.g., create records, update records, etc.). During or after completion of execution of the subset of the graph of nodes, the sequence tracking parameter may be updated. After execution of the subset of the graph of nodes, the graph may be closed. A user (e.g., the sales manager or subordinate) may be notified of the next action in the set of actions to complete. The sales manager may track the progress of each of the subordinates based on the updated records.

Figure 2:
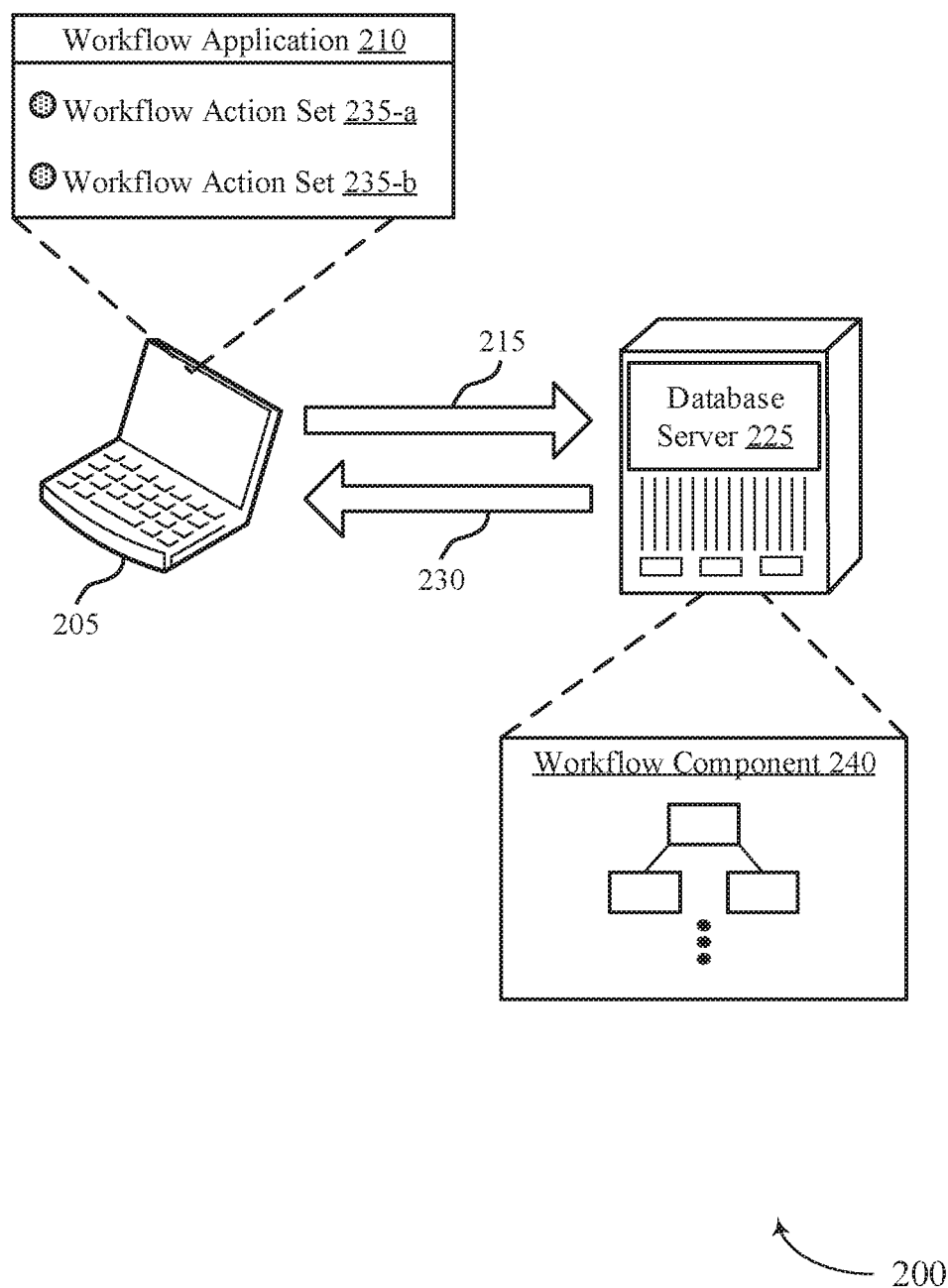
FIG. 2 illustrates an example of a system that supports action set translation in accordance with aspects of the present disclosure.

FIG. 2 illustrates an example of a system 200 that supports action set translation in accordance with aspects of the present disclosure. The system 200 includes a client device 205 and a database server 225. The client device 205, which may be an example of a cloud client 105 of FIG. 1, executes a workflow application 210 and transmits data to the database server 225 via a communication link 215 and receives data from the database server 225 via communication link 230. The database server 225, which may be an example of various components of subsystem 125 of FIG. 1, supports action set translation via a workflow component 240.

A user, such as an administrator or sales manager, utilizes a user interface supported by the workflow application 210 executing on the client device 205 to configure one or more workflow action sets 235 for one or more target identifiers. The target identifiers may be agents of a contact 110 of FIG. 1, for example. The workflow action sets 235 may include a sequence of actions in which the administrator, sales manager, or other parties of an associated organization is set to complete. In some cases, the target identifiers are sales leads or potential sales leads in which the set of actions are assigned to. In other cases, the action sets are not assigned to any specific target identifier. The workflow action sets 235 may include a sequence of actions such as email client, call client, wait for a time period, prepare documents, etc. In some cases, a workflow action set 235 may be assigned to many different target identifiers or may be scheduled to be performed multiple times. In some cases, separate workflow action sets 235 may be configured for different clients, contacts, or other targets.

The workflow action sets 235 may be transmitted to the database server 225 via the communication link 215. The workflow component 240, which may be an example of a workflow component 615 of FIG. 6 or 705 of FIG. 7, receives the workflow actions set 235 and translates the workflow actions set 235 into a graph of nodes including a set of nodes for each action type of the workflow action sets 235. Such translation may include identifying action types in the action set, retrieving or generating the nodes corresponding to the action types, and connecting the graph of nodes via one or more branch nodes or decision nodes. Each node may correspond to a set of processor executable instructions that are executed with the corresponding node is traversed. The generated graph of nodes may be stored in a data storage location of the database server 225 and retrieved and executed when an action of the action set is completed by a user of a user device (e.g., the client device 205). In some cases, the workflow component 240 initializes a sequence tracking parameter when a workflow action set 235 is assigned to a target identifier. Assignment to a target identifier may be transmitted via the communication link 215.

Assignment to a target identifier of a workflow action set 235, as well as completion of an action, may further trigger execution of the generated graph of nodes. Execution of the graph of nodes may include retrieving the graph of nodes from the corresponding storage location in the database server 225, and traversing a subset of the graph of nodes based on the status of the action set 235. Status of the action set may be determined based on the sequence tracking parameter. For example, when the workflow action set is assigned to a target identifier, the graph of nodes is retrieved. In the first node, the corresponding processor executable instructions determine whether the sequence tracking parameter is initialized. If the sequence tracking parameter is not initialized, the instructions corresponding to the next node may create the records and parameters for the graph of nodes and then determine the next step in the sequence of actions.

When an action is completed at the client device 205, an event is transmitted to the database server 225 via the communication link 215 and by the workflow application 210. The event may include an identification of the sequence tracking parameter. In response to receiving the event, the workflow component 240 may retrieve and execute the corresponding graph of nodes. Executing the graph of nodes may include executing the processor executable instructions corresponding to a subset of the graph of nodes. The subset may depend on the action completed, which may be identified by the value of the sequence tracking parameter. The sequence tracking parameter may be updated, and the graph may be closed after completion of execution of the processor executable instructions. Further, the database server 225 may transmit a notification via communication link 230, and the notification may indicate the next step in the workflow action set 235.

Accordingly, the graph of nodes corresponding to a workflow action set 235 may be loaded, executed, and closed upon completion of an action of the workflow action set 235. Because the graph of nodes includes a set of nodes for each action type, the graph of nodes remains relatively small and thus does not occupy significant data storage, memory, and processing resources. Further, because the sequence tracking parameter is utilized for determining the subset of nodes to execute, rather than maintain the state within the graph, the graph does not occupy processing resources, such as threads, waiting on completion of a next action.

In some cases, a generated graph of nodes is constant for any potential set of actions. For example, a set of actions may be generated using a finite number of action types. Accordingly, a node graph may include a "branch" for each of the potential action types. Thus, a graph of nodes may be constant for any potential action set. Accordingly, the status or progress of an action set is determined based on the sequence tracking parameter, and an instance of the node graph may be loaded for each action completion.

Figure 3:
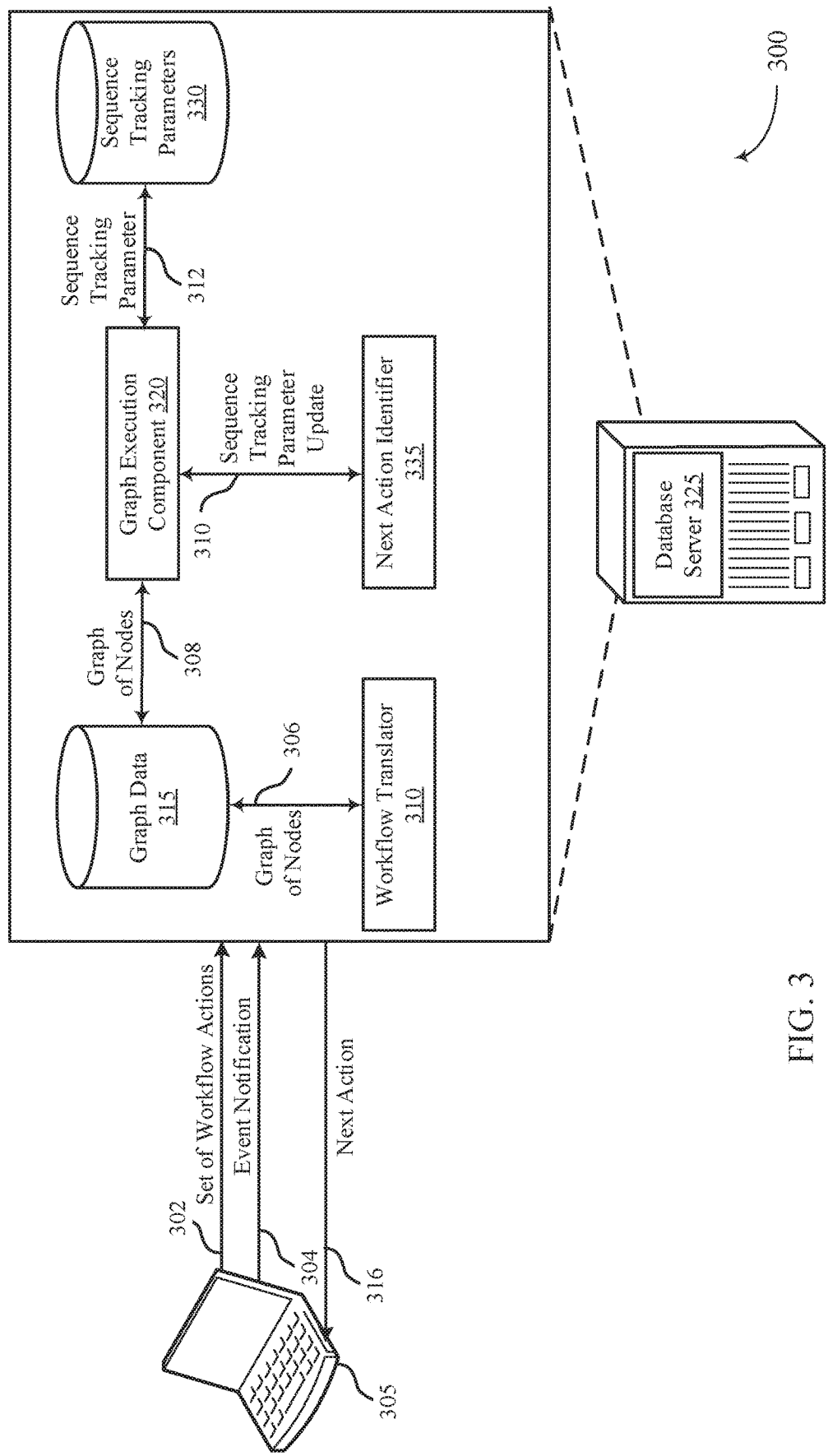
FIG. 3 illustrates an example of a system that supports action set translation in accordance with aspects of the present disclosure.

FIG. 3 illustrates an example of a system 300 that supports action set translation in accordance with aspects of the present disclosure. The system 300 includes a client device 305, which may be an example of the client device 205 of FIG. 2, and a database server 325, which may be an example of the database server 225 of FIG. 2. A user, such as an administrator or sales manager, utilizes a user interface supported by the workflow application executing on the client device 305 to configure one or more workflow action sets. The workflow action sets 235 may include a sequence of actions in which the administrator, sales manager, or other parties of an associated organization are scheduled to complete. The set of workflow actions 302 are transmitted to the database server 325, where a workflow translator 310 receives the set of workflow actions and translates the set of workflow actions into a graph of nodes 306. The workflow translator 310 may be an example of a workflow translator 625 of FIG. 6. The graph of nodes 306 may be stored at a graph datastore 315 for retrieval and execution upon receipt of an indication of a completion of an action of the set of workflow actions 302.

The client device 305 may transmit an event notification 304 to the database server 325 upon completion of an action or assignment of the set of workflow actions to a target identifier. The event notification 304 may include an identification of a sequence tracking parameter, a target identifier, etc. Upon receipt of the event notification 304, a graph execution component, which may be an example of a graph execution component 630 of FIG. 6, may retrieve the corresponding graph of nodes 306 for execution of the graph. Execution of the graph of nodes include execution of processor executable instructions corresponding to a subset of the graph of nodes. The subset may be based on the received target identifier and/or the sequence tracking parameter. In some cases, the graph execution component 320 determines whether the sequence tracking parameter is initialized. If the sequence tracking parameter is not initialized, the graph execution component 320 may initialize the sequence tracking parameter and store the sequence tracking parameter 312 in a sequence tracking parameter datastore 330. It should be understood that the sequence tracking parameter datastore and the graph datastore 315 may be in the same physical and/or logical datastore.

In cases where the event notification 304 includes an identification of the sequence tracking parameter, the graph execution component 320 may retrieve the current value of the sequence tracking parameter from the sequence tracking a parameter datastore 330, retrieve the graph of nodes 308 from the graph datastore 315, and execute the graph of nodes 308 based on the value of the sequence tracking parameter. The graph execution component 320 may further update the value of the sequence tracking parameter during or after completion of execution of the graph of nodes and update a next action identifier 335 of the value of the sequence tracking parameter. The next action identifier 335 may transmit a next action notification 316 to the client device 305. The client device 305 may notify the user or administrator of the next action to be completed.

Figure 4:
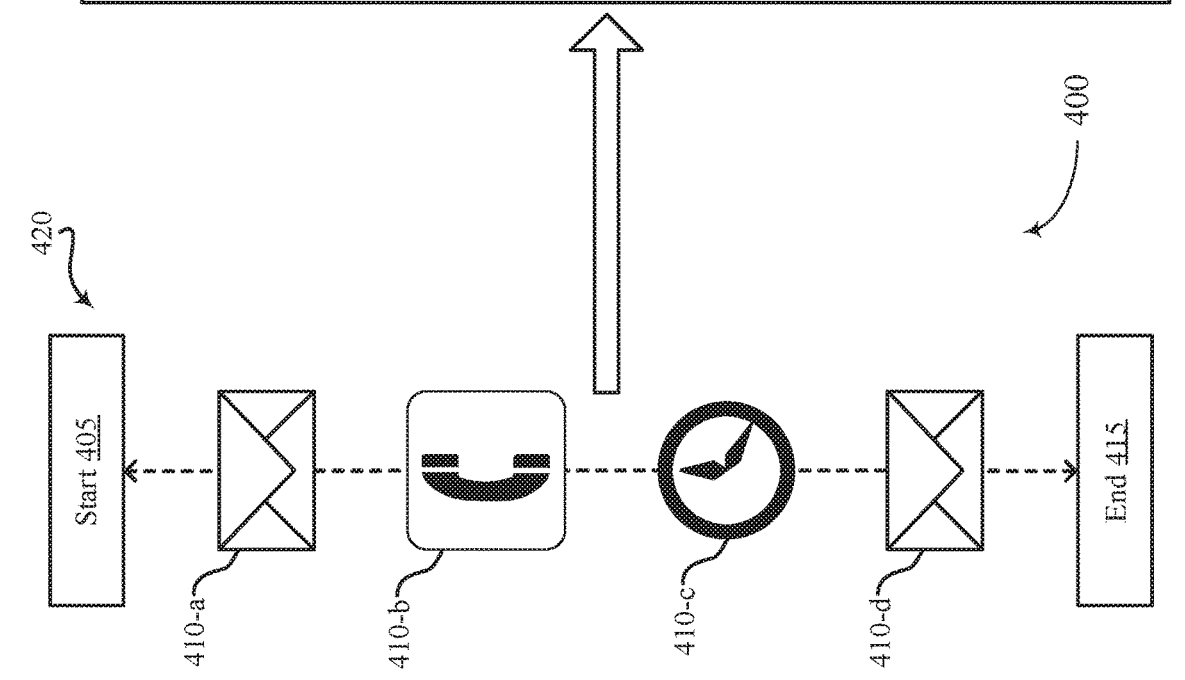
FIG. 4 illustrates an example of a translation that supports action set translation in accordance with aspects of the present disclosure.

FIG. 4 illustrates an example of a translation 400 that supports action set translation in accordance with aspects of the present disclosure. The translation 400 illustrates an example translation of a set of workflow actions 420 into a graph of nodes 470. The translation 400 may be performed by a database server 225 of FIG. 2 or the database server 325 of FIG. 3, for example. The set of workflow actions 420 may be configured by a sales manager or administrator (e.g., a user) of a cloud client 105 of FIG. 1, for example and using a workflow application executing a client device. The user may selectively place workflow actions 410 between a start action 405 and an end action 415. The set of workflow actions 420 includes send email actions 410-a and 410-d, call action 410-b, and wait action 410-c.

The database server receives the set of workflow actions 420 and translates the set of workflow actions 420 into the node graph 470. It should be understood that the node graph 470 is exemplary and an actual node graph corresponding to the set of workflow actions 420 may include more, fewer, and/or different nodes than illustrated. Each node may correspond to a set of processable executable instructions that are executed during execution of the graph of nodes 470. The node graph (e.g., graph of nodes) 470 may include a decision node 430 that determines whether the workflow is initialized. Such a determination may include determining whether a sequence tracking parameter is initialized. If the workflow is not initialized, then an initialize node 435 initializes the workflow by initializing the sequence tracking parameter. Each time the node graph 470 is executed, the process may start at the decision node 430. A identifying node 440 identifies the next action in the workflow set based on the value of the sequence tracking parameter.

A decision node 445 determines an action type of the set of workflow actions based on the value of the sequence tracking parameter. Each action type of the set of workflow actions 420 may include a corresponding set of nodes in the node graph 470. For example, a set of email nodes 450 corresponds to the email actions 410-a and 410-d, a set of phone nodes 455 corresponds to the phone action 410-b, and a set of wait nodes 460 correspond to the wait action 410-c. Each of the set of nodes corresponding to the action type is re-executable for each instance of the action type in the set of workflow actions 420. For example, the email nodes 450 are executed when the email action 410-a is completed and when the email action 410-d is completed. Accordingly, rather than including multiple node sets for each of the email actions 410-a and 410-d, the graph of nodes 470 includes one node set corresponding to the email actions 410 behind the decision node 445, which determines which action type should be processed (e.g., based on a sequence tracking parameter).

The node graph 470 may be stored in a datastore, retrieved, and executed upon completion of actions and/or assignment of the set of workflow actions 420 to a target identifier. The node graph 470 may close upon completion of execution of the set of actions. In some cases, execution of the node graph 470 may fail. The node graph 470 may include a path for errors (not shown). The path for errors may include nodes corresponding to executable processor executable instructions that cause an error message to be update and the node graph 470 to be exited.

The wait nodes 460 may include processes that keep the node graph 470 open for a time period indicated by the wait action 410-c of the set of actions 420. However, because the node graph 470 is not "waiting" for each action to be completed, the graph 470 utilizes very little processing resources compared to a linear graph that does stay open, maintain state, and wait for each action to complete.

Figure 5:
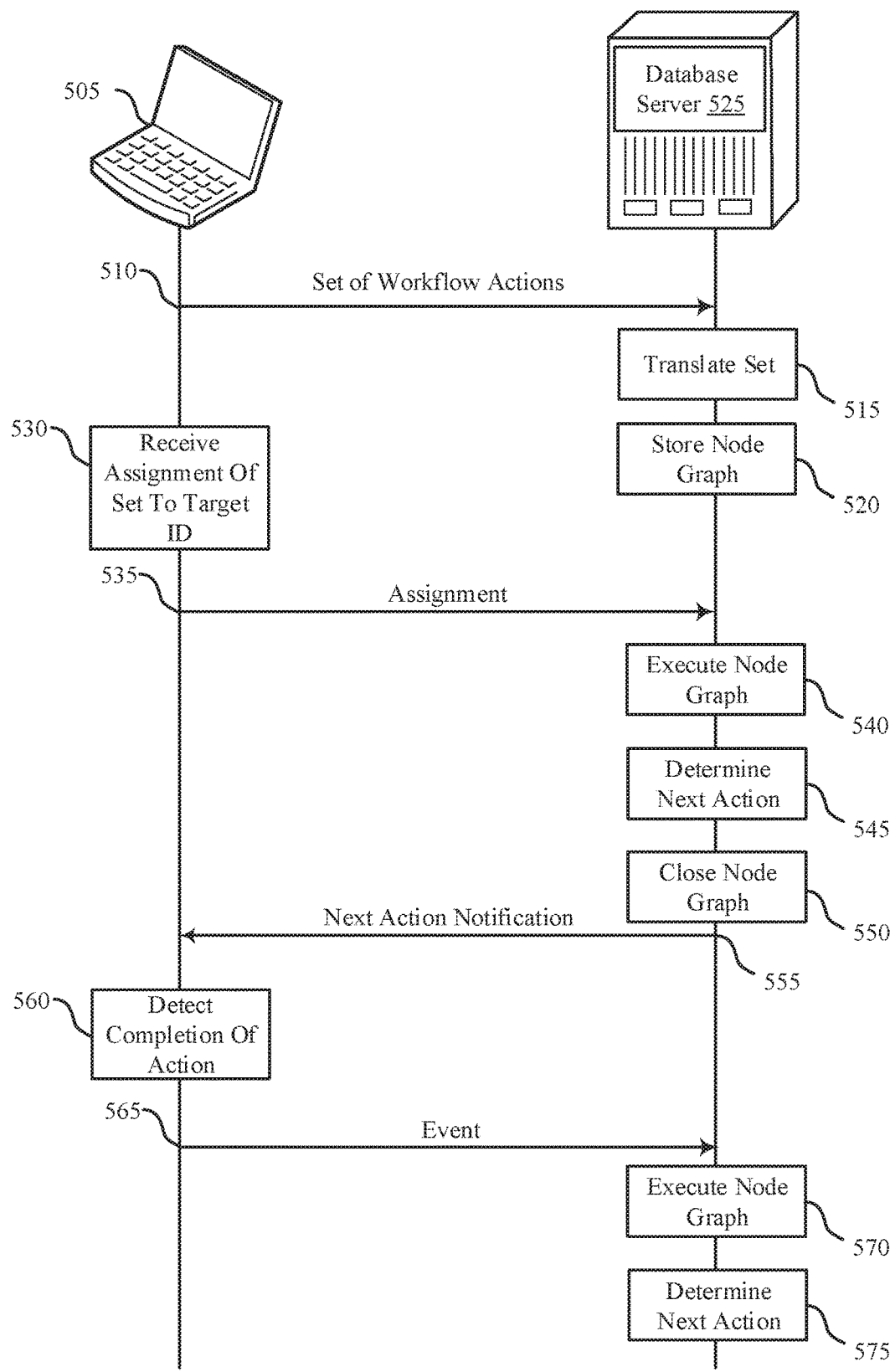
FIG. 5 illustrates an example of a process flow that supports action set translation in accordance with aspects of the present disclosure.

FIG. 5 illustrates an example of a process flow 500 that supports action set translation in accordance with aspects of the present disclosure. The process flow 500 includes a client device 505, which may be an example of a client device 205 of FIG. 2 or 305 of FIG. 3, and a database server 525, which may be an example of a database server 2225 of FIG. 2 or 325 of FIG. 3. At 510, the client device 505 transmits a set of a workflow actions to the database server 525. The client device 505 may transmit the set responsive to a user configuring a set using a workflow application on the client device 505. At 515, the database server 525 translates the set of workflow actions into a graph of nodes, which is stored at step 520. The set of workflow actions may include a node set corresponding to each action type of the set of work flow actions, and each node set corresponding to each action type is re-executable for each instance of an action types in the set of workflow actions. Translation of the set of workflow actions may include identifying each type of action, retrieving the node corresponding to each action type, linking the corresponding nodes to a decision node and an initialize node.

At 530, the client device 505 receives an assignment of the set of workflow actions to a target identifier. At 535 the client device 505 transmits the assignment to the database server 525. The transmitted assignment may be an example of an event notification. At 540, the database server 525 (e.g., a database system), executes the graph of nodes responsive to receiving the assignment 535. Executing the graph of nodes may comprise executing processor executable instructions associated with a subset of the graph of nodes. In some cases, executing the graph of nodes includes initializing a sequence tracking parameter. At 545, the database server 525 determines the next action based on the value of the sequence tracking parameter. In some cases, the sequence tracking parameter is updated by the database server 525. At 550, the database server closes the graph of nodes responsive to executing the graph of nodes. Closing the graph of nodes includes releasing computing resources (e.g., processing threads and/or memory) utilized by the graph of nodes.

At 555, the database server transmits a next action notification to the client device. The next action notification may indicate, to the user, the next action to be completed in the set of workflow actions. At 560, the client device 505 detects completion of an action of the set of workflow actions. At 565 transmits an event notification to the database server 525. The event notification may include an identification of the sequence tracking parameter. At 570, the database server 570 reloads and re-executes the graph of nodes. Execution of the graph of nodes may include executing the processor executable instructions associated with a subset of the graph of nodes based at least in part on the action completed, which may be indicated by the value of the sequence tracking parameter. At 575, the database server 525 determines the next action. In some cases, the database server 525 updates the sequence tracking parameter.

Figure 6:
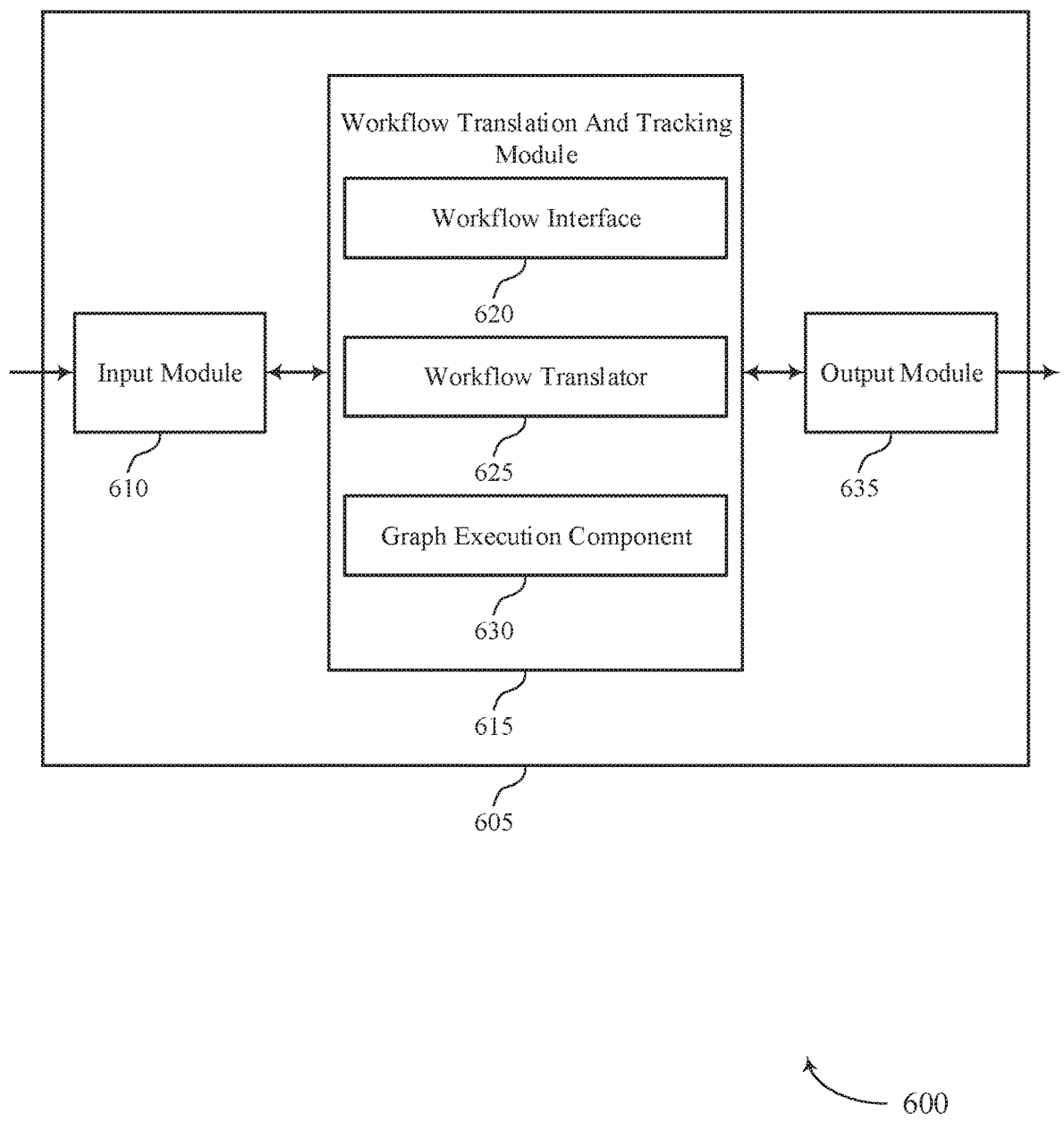
FIG. 6 shows a block diagram of an apparatus that supports action set translation in accordance with aspects of the present disclosure.

FIG. 6 shows a block diagram 600 of an apparatus 605 that supports action set translation in accordance with aspects of the present disclosure. The apparatus 605 may include an input module 610, a workflow component 615, and an output module 635. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the workflow component 615 to support action set translation. In some cases, the input module 610 may be a component of an input/output (I/O) controller 815 as described with reference to FIG. 8.

The workflow component 615 may include a workflow interface 620, a workflow translator 625, and a graph execution component 630. The workflow component 615 may be an example of aspects of the workflow component 705 or 810 described with reference to FIGS. 7 and 8.

The workflow component 615 and/or at least some of its various sub-components may be implemented in hardware, software executed by a processor, firmware, or any combination thereof. If implemented in software executed by a processor, the functions of the workflow component 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The workflow component 615 and/or at least some of its various sub-components may be physically located at various positions, including being distributed such that portions of functions are implemented at different physical locations by one or more physical devices. In some examples, the workflow component 615 and/or at least some of its various sub-components may be a separate and distinct component in accordance with various aspects of the present disclosure. In other examples, the workflow component 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The workflow interface 620 may receive, at a database system, a set of workflow actions.

The workflow translator 625 may translate the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions.

The graph execution component 630 may execute the graph of nodes on the database system responsive to receiving an event notification indicating completion of a first action of the set of workflow actions, where executing the graph of nodes includes executing the processor executable instructions associated with a subset of the graph of nodes based at least on the first action.

The output module 635 may manage output signals for the apparatus 605. For example, the output module 635 may receive signals from other components of the apparatus 605, such as the workflow component 615, and may transmit these signals to other components or devices. In some specific examples, the output module 635 may transmit output signals for display in a user interface, for storage in a database or datastore, for further processing at a server or server cluster, or for any other processes at any number of devices or systems. In some cases, the output module 635 may be a component of an I/O controller 815 as described with reference to FIG. 8.

Figure 7:
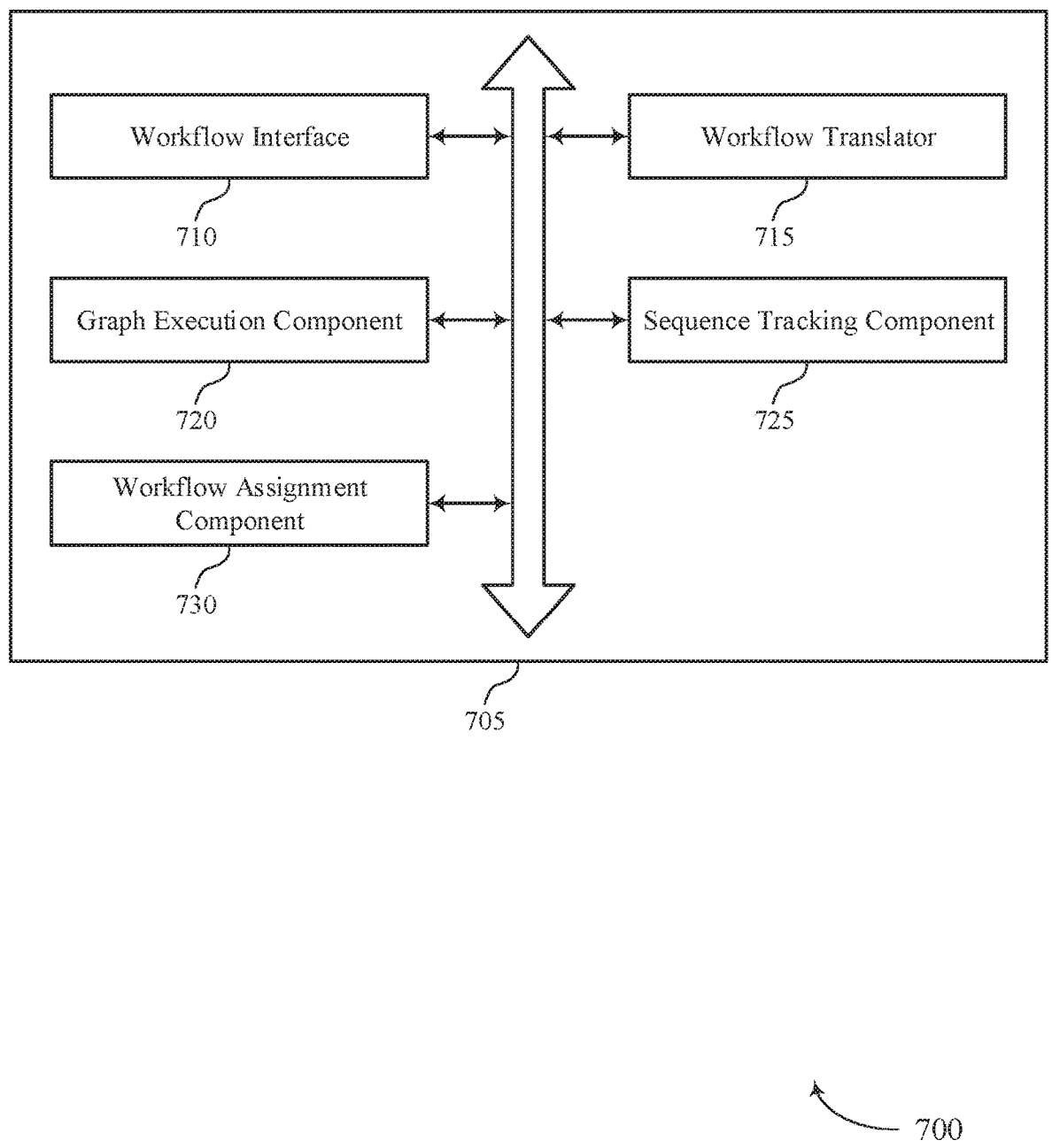
FIG. 7 shows a block diagram of a workflow component that supports action set translation in accordance with aspects of the present disclosure.

FIG. 7 shows a block diagram 700 of a workflow component 705 that supports action set translation in accordance with aspects of the present disclosure. The workflow component 705 may be an example of aspects of a workflow component 615 or a workflow component 810 described herein. The workflow component 705 may include a workflow interface 710, a workflow translator 715, a graph execution component 720, a sequence tracking component 725, and a workflow assignment component 730. Each of these modules may communicate, directly or indirectly, with one another (e.g., via one or more buses).

The workflow interface 710 may receive, at a database system, a set of workflow actions.

The workflow translator 715 may translate the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions.

The graph execution component 720 may execute the graph of nodes on the database system responsive to receiving an event notification indicating completion of a first action of the set of workflow actions, where executing the graph of nodes includes executing the processor executable instructions associated with a subset of the graph of nodes based at least on the first action.

In some examples, the graph execution component 720 may execute the graph of nodes responsive to receiving the event notification, where the subset of the graph of nodes is further based at least on the sequence tracking parameter.

In some examples, the graph execution component 720 may update the sequence tracking parameter responsive to executing the graph of nodes.

In some examples, the graph execution component 720 may close the graph of nodes responsive to executing the graph of nodes, where closing the graph of nodes includes releasing computing resources utilized by the graph of nodes.

In some examples, the graph execution component 720 may reloads the graph of nodes responsive to receiving an additional event notification corresponding to completion of an additional action of the set of workflow actions, the additional event notification indicating a sequence tracking parameter utilized to maintain a sequence defining an order of the set of workflow actions.

In some cases, the event notification indicates a sequence tracking parameter utilized to maintain a sequence defining an order of the set of workflow actions.

The sequence tracking component 725 may initialize a sequence tracking parameter responsive to receiving an assignment of the set of workflow actions to a target identifier, the sequence tracking parameter utilized to maintain a sequence defining an order of the set of workflow actions.

The workflow assignment component 730 may receive an assignment of the set of workflow actions to a target identifier.

Figure 8:
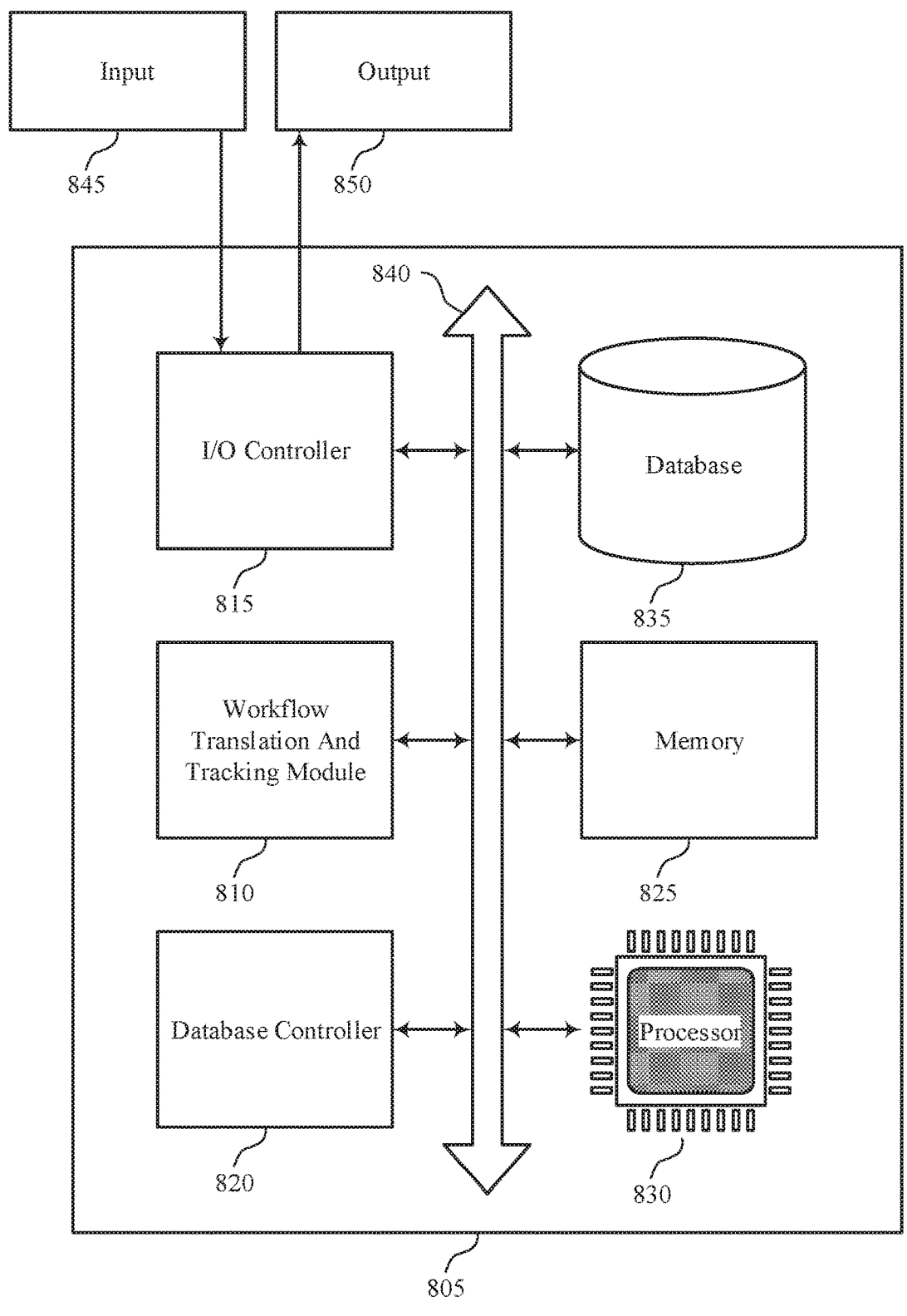
FIG. 8 shows a diagram of a system including a device that supports action set translation in accordance with aspects of the present disclosure.

FIG. 8 shows a diagram of a system 800 including a device 805 that supports action set translation in accordance with aspects of the present disclosure. The device 805 may be an example of or include the components of a database server or an apparatus 605 as described herein. The device 805 may include components for bi-directional data communications including components for transmitting and receiving communications, including a workflow component 810, an I/O controller 815, a database controller 820, memory 825, a processor 830, and a database 835. These components may be in electronic communication via one or more buses (e.g., bus 840).

The workflow component 810 may be an example of a workflow component 615 or 705 as described herein. For example, the workflow component 810 may perform any of the methods or processes described above with reference to FIGS. 6 and 7. In some cases, the workflow component 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a datastore, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting action set translation).

Figure 9:
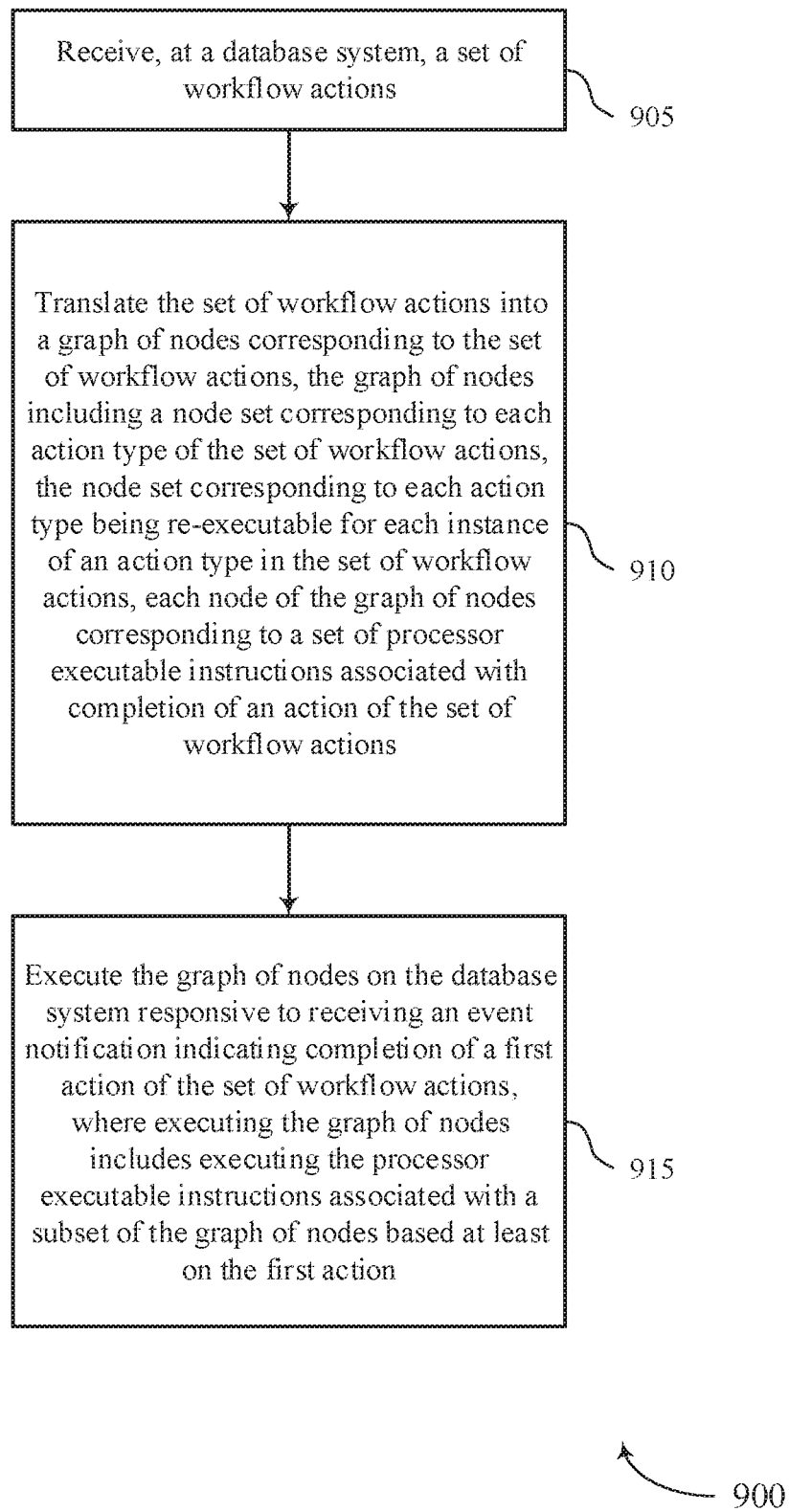
FIGS. 9 through 11 show flowcharts illustrating methods that support action set translation in accordance with aspects of the present disclosure.

FIG. 9 shows a flowchart illustrating a method 900 that supports action set translation in accordance with aspects of the present disclosure. The operations of method 900 may be implemented by a database server or its components as described herein. For example, the operations of method 900 may be performed by a workflow component as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 905, the database server may receive, at a database system, a set of workflow actions. The operations of 905 may be performed according to the methods described herein. In some examples, aspects of the operations of 905 may be performed by a workflow interface as described with reference to FIGS. 6 through 8.

At 910, the database server may translate the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions. The operations of 910 may be performed according to the methods described herein. In some examples, aspects of the operations of 910 may be performed by a workflow translator as described with reference to FIGS. 6 through 8.

At 915, the database server may execute the graph of nodes on the database system responsive to receiving an event notification indicating completion of a first action of the set of workflow actions, where executing the graph of nodes includes executing the processor executable instructions associated with a subset of the graph of nodes based at least on the first action. The operations of 915 may be performed according to the methods described herein. In some examples, aspects of the operations of 915 may be performed by a graph execution component as described with reference to FIGS. 6 through 8.

Figure 10:
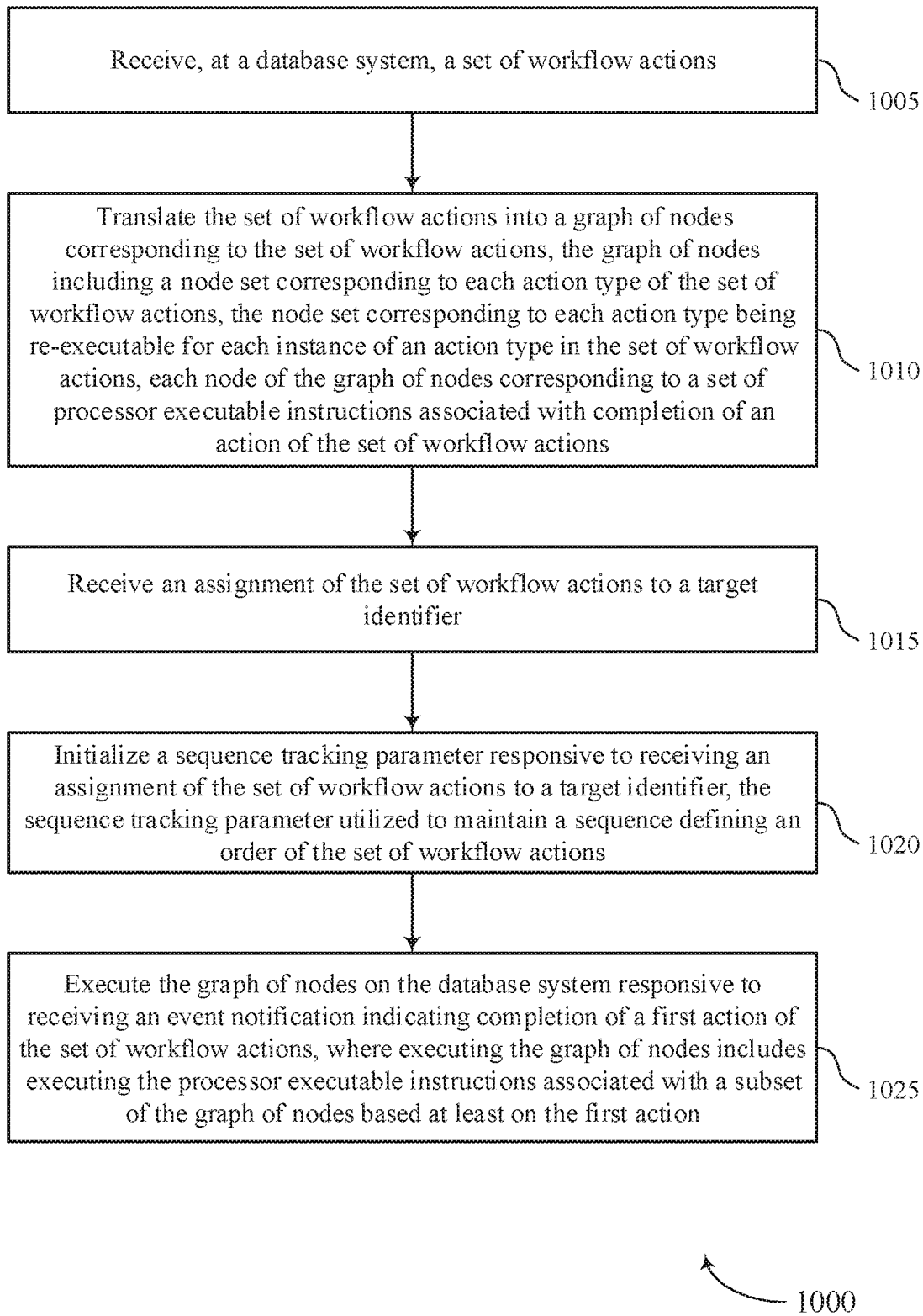

FIG. 10 shows a flowchart illustrating a method 1000 that supports action set translation in accordance with aspects of the present disclosure. The operations of method 1000 may be implemented by a database server or its components as described herein. For example, the operations of method 1000 may be performed by a workflow component as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1005, the database server may receive, at a database system, a set of workflow actions. The operations of 1005 may be performed according to the methods described herein. In some examples, aspects of the operations of 1005 may be performed by a workflow interface as described with reference to FIGS. 6 through 8.

At 1010, the database server may translate the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions. The operations of 1010 may be performed according to the methods described herein. In some examples, aspects of the operations of 1010 may be performed by a workflow translator as described with reference to FIGS. 6 through 8.

At 1015, the database server may receive an assignment of the set of workflow actions to a target identifier. The operations of 1015 may be performed according to the methods described herein. In some examples, aspects of the operations of 1015 may be performed by a workflow assignment component as described with reference to FIGS. 6 through 8.

At 1020, the database server may initialize a sequence tracking parameter responsive to receiving an assignment of the set of workflow actions to a target identifier, the sequence tracking parameter utilized to maintain a sequence defining an order of the set of workflow actions. The operations of 1020 may be performed according to the methods described herein. In some examples, aspects of the operations of 1020 may be performed by a sequence tracking component as described with reference to FIGS. 6 through 8.

At 1025, the database server may execute the graph of nodes on the database system responsive to receiving an event notification indicating completion of a first action of the set of workflow actions, where executing the graph of nodes includes executing the processor executable instructions associated with a subset of the graph of nodes based at least on the first action. The operations of 1025 may be performed according to the methods described herein. In some examples, aspects of the operations of 1025 may be performed by a graph execution component as described with reference to FIGS. 6 through 8.

Figure 11:
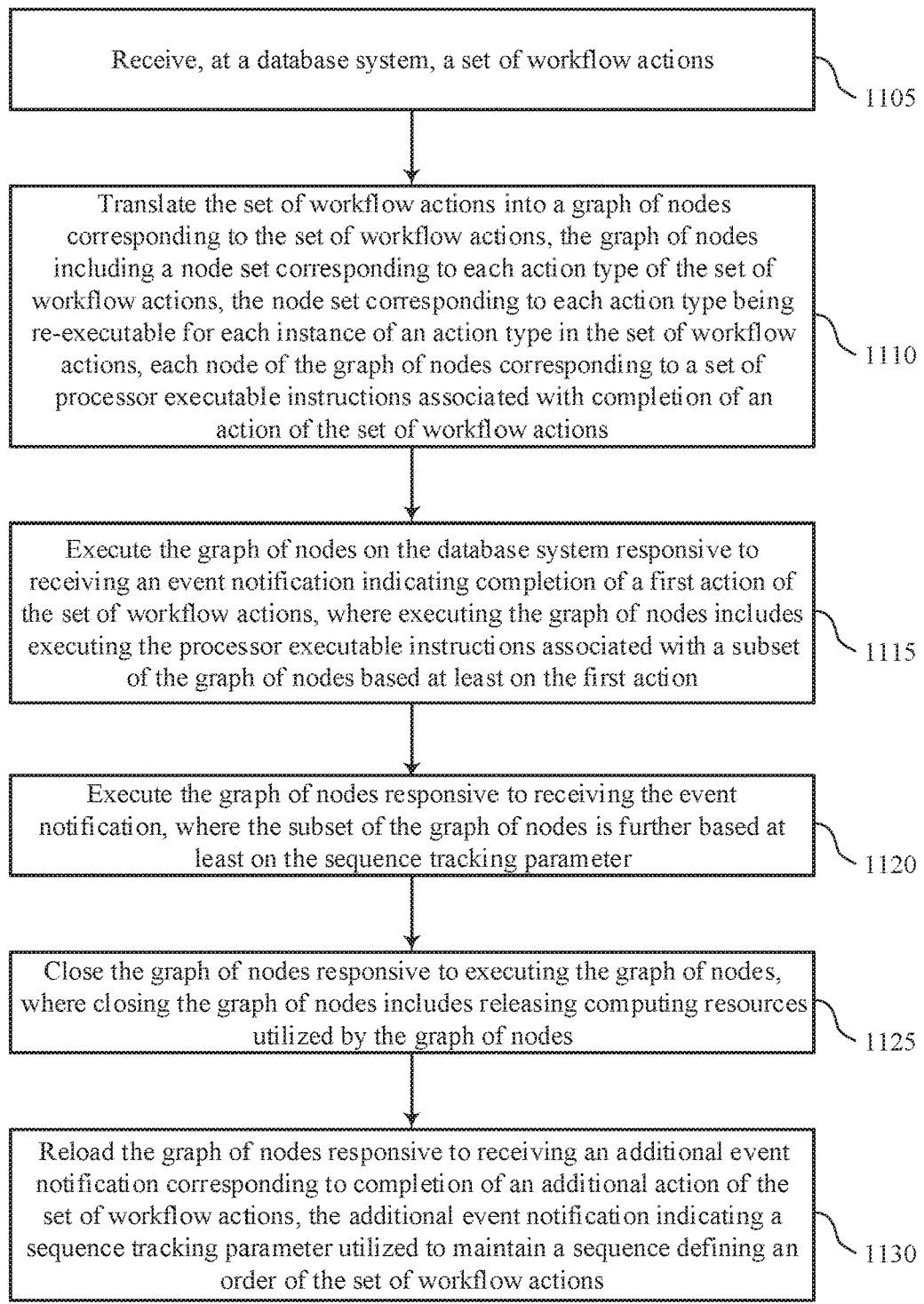

FIG. 11 shows a flowchart illustrating a method 1100 that supports action set translation in accordance with aspects of the present disclosure. The operations of method 1100 may be implemented by a database server or its components as described herein. For example, the operations of method 1100 may be performed by a workflow component as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1105, the database server may receive, at a database system, a set of workflow actions. The operations of 1105 may be performed according to the methods described herein. In some examples, aspects of the operations of 1105 may be performed by a workflow interface as described with reference to FIGS. 6 through 8.

At 1110, the database server may translate the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions. The operations of 1110 may be performed according to the methods described herein. In some examples, aspects of the operations of 1110 may be performed by a workflow translator as described with reference to FIGS. 6 through 8.

At 1115, the database server may execute the graph of nodes on the database system responsive to receiving an event notification indicating completion of a first action of the set of workflow actions, where executing the graph of nodes includes executing the processor executable instructions associated with a subset of the graph of nodes based at least on the first action. The operations of 1115 may be performed according to the methods described herein. In some examples, aspects of the operations of 1115 may be performed by a graph execution component as described with reference to FIGS. 6 through 8.

At 1120, the database server may execute the graph of nodes responsive to receiving the event notification, where the subset of the graph of nodes is further based at least on the sequence tracking parameter. The operations of 1125 may be performed according to the methods described herein. In some examples, aspects of the operations of 1125 may be performed by a graph execution component as described with reference to FIGS. 6 through 8.

At 1125, the database server may close the graph of nodes responsive to executing the graph of nodes, where closing the graph of nodes includes releasing computing resources utilized by the graph of nodes. The operations of 1130 may be performed according to the methods described herein. In some examples, aspects of the operations of 1130 may be performed by a graph execution component as described with reference to FIGS. 6 through 8.

At 1130, the database server may reload the graph of nodes responsive to receiving an additional event notification corresponding to completion of an additional action of the set of workflow actions, the additional event notification indicating a sequence tracking parameter utilized to maintain a sequence defining an order of the set of workflow actions. The operations of 1135 may be performed according to the methods described herein. In some examples, aspects of the operations of 1135 may be performed by a graph execution component as described with reference to FIGS. 6 through 8.

A method of database processing including is described. The method may include receiving, at a database system, a set of workflow actions, translating the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions, and executing the graph of nodes on the database system responsive to receiving an event notification indicating completion of a first action of the set of workflow actions, where executing the graph of nodes includes executing the processor executable instructions associated with a subset of the graph of nodes based at least on the first action.

An apparatus for database processing including is described. The apparatus may include a processor, memory in electronic communication with the processor, and instructions stored in the memory. The instructions may be executable by the processor to cause the apparatus to receive, at a database system, a set of workflow actions, translate the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions, and execute the graph of nodes on the database system responsive to receiving an event notification indicating completion of a first action of the set of workflow actions, where executing the graph of nodes includes executing the processor executable instructions associated with a subset of the graph of nodes based at least on the first action.

Another apparatus for database processing including is described. The apparatus may include means for receiving, at a database system, a set of workflow actions, translating the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions, and executing the graph of nodes on the database system responsive to receiving an event notification indicating completion of a first action of the set of workflow actions, where executing the graph of nodes includes executing the processor executable instructions associated with a subset of the graph of nodes based at least on the first action.

A non-transitory computer-readable medium storing code for database processing including is described. The code may include instructions executable by a processor to receive, at a database system, a set of workflow actions, translate the set of workflow actions into a graph of nodes corresponding to the set of workflow actions, the graph of nodes including a node set corresponding to each action type of the set of workflow actions, the node set corresponding to each action type being re-executable for each instance of an action type in the set of workflow actions, each node of the graph of nodes corresponding to a set of processor executable instructions associated with completion of an action of the set of workflow actions, and execute the graph of nodes on the database system responsive to receiving an event notification indicating completion of a first action of the set of workflow actions, where executing the graph of nodes includes executing the processor executable instructions associated with a subset of the graph of nodes based at least on the first action.

Some examples of the method, apparatuses, and non-transitory computer-readable medium described herein may further include operations, features, means, or instructions for initializing a sequence tracking parameter responsive to receiving an assignment of the set of workflow actions to a target identifier, the sequence tracking parameter utilized to maintain a sequence defining an order of the set of workflow actions.

Some examples of the method, apparatuses, and non-transitory computer-readable medium described herein may further include operations, features, means, or instructions for receiving an assignment of the set of workflow actions to a target identifier.

In some examples of the method, apparatuses, and non-transitory computer-readable medium described herein, the event notification indicates a sequence tracking parameter utilized to maintain a sequence defining an order of the set of workflow actions.

Some examples of the method, apparatuses, and non-transitory computer-readable medium described herein may further include operations, features, means, or instructions for executing the graph of nodes responsive to receiving the event notification, where the subset of the graph of nodes may be further based at least on the sequence tracking parameter.

Some examples of the method, apparatuses, and non-transitory computer-readable medium described herein may further include operations, features, means, or instructions for updating the sequence tracking parameter responsive to executing the graph of nodes.

Some examples of the method, apparatuses, and non-transitory computer-readable medium described herein may further include operations, features, means, or instructions for closing the graph of nodes responsive to executing the graph of nodes, where closing the graph of nodes includes releasing computing resources utilized by the graph of nodes.

Some examples of the method, apparatuses, and non-transitory computer-readable medium described herein may further include operations, features, means, or instructions for reloading the graph of nodes responsive to receiving an additional event notification corresponding to completion of an additional action of the set of workflow actions, the additional event notification indicating a sequence tracking parameter utilized to maintain a sequence defining an order of the set of workflow actions.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for database processing comprising:
   receiving, at a database system, a set of workflow actions including at least a first action with a first action type and a second action with the first action type;
   translating the first action and the second action into a first node of a graph of nodes based at least in part on the first action and the second action having the same first action type, the graph of nodes having a fixed quantity of nodes that is dependent on a number of different action types of the set of workflow actions, at least one node corresponding to a set of processor executable instructions associated with completion of an action of the set of workflow action, the set of processor executable instructions being re-executable for at least one instance of an action type in the set of work flow actions; and
   executing the graph of nodes on the database system responsive to receiving an event notification indicating completion of the first action of the set of workflow actions, wherein executing the graph of nodes comprises executing the processor executable instructions associated with a subset of the graph of nodes based at least in part on completion of the first action.

2. The method of claim 1, wherein the set of workflow actions is associated with a sequence defining an order of actions of the set of workflow actions:
   initializing a sequence tracking parameter responsive to receiving an assignment of the set of workflow actions to a target identifier, the sequence tracking parameter utilized to maintain the sequence defining the order of the set of workflow actions.

3. The method of claim 1, further comprising:
   receiving an assignment of the set of workflow actions to a target identifier.

4. The method of claim 1, wherein the event notification indicates a sequence tracking parameter utilized to maintain a sequence defining an order of the set of workflow actions.

5. The method of claim 4, further comprising:
   executing the graph of nodes responsive to receiving the event notification, wherein the subset of the graph of nodes is further based at least on the sequence tracking parameter.

6. The method of claim 5, further comprising:
   updating the sequence tracking parameter responsive to executing the graph of nodes.

7. The method of claim 1, further comprising:
   closing the graph of nodes responsive to executing the graph of nodes, wherein closing the graph of nodes includes releasing computing resources utilized by the graph of nodes.

8. The method of claim 7, further comprising:
   reloading the graph of nodes responsive to receiving an additional event notification corresponding to completion of an additional action of the set of workflow actions, the additional event notification indicating a sequence tracking parameter utilized to maintain a sequence defining an order of the set of workflow actions.

9. The method of claim 1, wherein executing the graph of nodes triggers a notification, via a user device, indicating a next action of the set of workflow actions.

10. The method of claim 1, wherein a size of the graph of nodes is based at least on a number of action types of the set of workflow actions.

11. An apparatus for database processing, comprising:
a processor,
memory in electronic communication with the processor; and
instructions stored in the memory and executable by the processor to cause the apparatus to:
receive, at a database system, a set of workflow actions including at least a first action with a first action type and a second action with the first action type;
translate the first action and the second action into a first node of a graph of nodes based at least in part on the first action and the second action having the same first action type, the graph of nodes having a fixed quantity of nodes that is dependent on a number of different action types of the set of workflow actions, at least one node corresponding to a set of processor executable instructions associated with completion of an action of the set of workflow action, the set of processor executable instructions being re-executable for at least one instance of an action type in the set of work flow actions; and
execute the graph of nodes on the database system responsive to receiving an event notification indicating completion of the first action of the set of workflow actions, wherein executing the graph of nodes comprises executing the processor executable instructions associated with a subset of the graph of nodes based at least in part on completion of the first action.

12. The apparatus of claim 11, wherein the event notification indicates a sequence tracking parameter utilized to maintain a sequence defining an order of the set of workflow actions.

13. The apparatus of claim 12, wherein the instructions are further executable by the processor to cause the apparatus to:
execute the graph of nodes responsive to receiving the event notification, wherein the subset of the graph of nodes is further based at least on the sequence tracking parameter.

14. The apparatus of claim 13, wherein the instructions are further executable by the processor to cause the apparatus to:
update the sequence tracking parameter responsive to executing the graph of nodes.

15. The apparatus of claim 11, wherein the instructions are further executable by the processor to cause the apparatus to:
close the graph of nodes responsive to executing the graph of nodes, wherein closing the graph of nodes includes releasing computing resources utilized by the graph of nodes.

16. The apparatus of claim 15, wherein the instructions are further executable by the processor to cause the apparatus to:
reload the graph of nodes responsive to receiving an additional event notification corresponding to completion of an additional action of the set of workflow actions, the additional event notification indicating a sequence tracking parameter utilized to maintain a sequence defining an order of the set of workflow actions.

17. A non-transitory computer-readable medium storing code for database processing comprising, the code comprising instructions executable by a processor to:
receive, at a database system, a set of workflow actions including at least a first action with a first action type and a second action with the first action type;
translate the first action and the second action into a first node of a graph of nodes based at least in part on the first action and the second action having the same first action type, the graph of nodes having a fixed quantity of nodes that is dependent on a number of different action types of the set of workflow actions, at least one node corresponding to a set of processor executable instructions associated with completion of an action of the set of workflow action, the set of processor executable instructions being re-executable for at least one instance of an action type in the set of work flow actions; and
execute the graph of nodes on the database system responsive to receiving an event notification indicating completion of the first action of the set of workflow actions, wherein executing the graph of nodes comprises executing the processor executable instructions associated with a subset of the graph of nodes based at least in part on completion of the first action.

18. The non-transitory computer-readable medium of claim 17, wherein the instructions are further executable to:
close the graph of nodes responsive to executing the graph of nodes, wherein closing the graph of nodes includes releasing computing resources utilized by the graph of nodes.

19. The non-transitory computer-readable medium of claim 18, wherein the instructions are further executable to:
reload the graph of nodes responsive to receiving an additional event notification corresponding to completion of an additional action of the set of workflow actions, the additional event notification indicating a sequence tracking parameter utilized to maintain a sequence defining an order of the set of workflow actions.

20. The non-transitory computer-readable medium of claim 17, wherein a size of the graph of nodes is based at least on a number of action types of the set of workflow actions.

* * * * *